UNITED STATES PATENT OFFICE.

WILLIAM N. RUMELY, OF LA PORTE, INDIANA.

ANTIFRICTION ALLOY.

SPECIFICATION forming part of Letters Patent No. 650,911, dated June 5, 1900.

Application filed April 2, 1900. Serial No. 11,208. (No specimens.)

*To all whom it may concern:*

Be it known that I, WILLIAM N. RUMELY, a citizen of the United States, residing at La Porte, La Porte county, Indiana, (post-office address, La Porte, Indiana,) have invented certain new and useful Improvements in Antifriction Alloys, of which the following is a specification.

My improved antifriction alloy is formed of lead, tin, antimony, nickel, and phosphor-tin, united by fusion. The best proportions of the component parts are: lead, about seventy-two parts; tin, about fifteen parts, the lead and tin together forming eighty-seven parts; antimony, twelve parts; nickel, .75 part; phosphor-tin, .25 part. The phosphor-tin employed is for the purpose of getting about .0175 part of phosphorus into the alloy, and this will be accomplished by using .25 part of the phosphor-tin now generally found in the market and containing about seven per cent. of phosphorus.

The alloy thus formed is of superior excellence for bearings under high facilities and high pressures.

I claim as my invention—

1. The improved antifriction alloy formed of lead, tin, antimony, nickel, and phosphorus, substantially as set forth.

2. The improved antifriction alloy formed of lead about seventy-two parts, antimony twelve parts, phosphorus .0175 part and tin about 15.9825 parts, substantially as set forth.

WILLIAM N. RUMELY.

Witnesses:
F. G. ANDREW,
J. VENE DORLAND.